United States Patent [19]

Itou

[11] Patent Number: 5,268,818
[45] Date of Patent: Dec. 7, 1993

[54] CONTACT STRUCTURE FOR TOY MOTORS
[75] Inventor: Fumiyoshi Itou, Matsudo, Japan
[73] Assignee: Mabuchi Motor Co., Ltd., Chiba, Japan
[21] Appl. No.: 983,833
[22] Filed: Dec. 1, 1992
[30] Foreign Application Priority Data Dec. 3, 1991 [JP] Japan .............................. 3-099506[U]

[51] Int. Cl.$^5$ ........................... H02K 1/04; H02K 1/06
[52] U.S. Cl. ................................ 361/730; 200/51 R; 200/567; 310/68 A; 318/17; 439/500; 446/484
[58] Field of Search .................. 318/3, 17; 310/40 R, 310/42, 43, 50, 68 A, 89; 361/331, 380, 393, 394, 417, 419, 420; 439/500; 200/273, 274, 564, 567, 570, 51 R, 61.58 R, 6 C, 17 R, 11 R, 11 G; 446/158, 163, 484; 362/155, 194, 196, 199, 204, 205

[56] References Cited
U.S. PATENT DOCUMENTS

| | | | |
|---|---|---|---|
| 3,283,137 | 11/1966 | Hoesl | 362/194 |
| 3,450,908 | 6/1969 | Mabuchi | 446/163 |
| 3,859,489 | 1/1975 | Tomlinson | 200/570 |
| 4,636,596 | 1/1987 | Takada | 200/52 R |
| 4,697,133 | 9/1987 | Pergandis | 320/2 |

Primary Examiner—Gerald P. Tolin
Attorney, Agent, or Firm—McGlew and Tuttle

[57] ABSTRACT

A contact structure for toy motors in which a battery case housing a battery and a motor case housing a motor are detachably and relatively rotatably joined by means of the outer circumferential surface of the end of the battery case and the inner circumferential surface of the end of the motor case, and terminals are provided in the vicinity of the ends of both cases in such a manner that the terminals can be brought into contact with, or separated from each other, characterized in that the cross-sectional shape of the ends of motor terminals provided on the motor case is formed into a U shape having a closed end on the side of the outer circumferential surface thereof, with the end thereof on the side of the axial line of the motor being opened, and the inside surfaces of the battery terminals are brought into contact with the outer circumferential surfaces of the closed ends of the motor terminals.

4 Claims, 3 Drawing Sheets

CONTACT STRUCTURE FOR TOY MOTORS

BACKGROUND OF THE INVENTION

This invention relates generally to a contact structure having a switching function for making and breaking electrical connection between a toy motor and a power-source battery, and more particularly to a contact structure for toy motors that can smoothly and positively join a battery case housing a battery with a motor case housing a motor.

DESCRIPTION OF THE PRIOR ART

FIG. 1 is a longitudinal sectional view illustrating an example of toy submersible motor of a conventional type. In FIG. 1, numeral 1 refers to a battery case formed into a bottomed hollow cylindrical shape in which a battery 2 can be detachably housed. Numeral 3 refers to a motor case formed into a bottomed hollow cylindrical shape in which a motor 4 is housed. On an end of the motor case 3 protruded is a shaft 5, to which a propeller 6 is fixedly fitted. Numeral 7 refers to a rudder rotatably provided on a support 8 protruded at an end of the motor case 3.

Numeral 9 refers to a mounting part integrally provided on the side surface of the motor case 3. Numerals 10 and 11 refer to a positive and negative terminals, respectively, provided in such a manner as to face the joint part of the motor case 3. Numeral 12 refers to a negative terminal provided in such a manner as to face the joint part of the battery case 1, and formed in such a manner as to come in contact with the inner circumferential surface of the negative terminal 11 and in such a manner that the outer circumferential surface of the battery case 1 at the joint part thereof can be detachably and relatively rotatably joined with the inner circumferential surface of the motor case 3 at the joint part thereof.

With the aforementioned construction, the motor 4 can be driven to cause the propeller 6 to rotate by joining the battery case 1 with the motor case 3 and rotating the battery case 1, causing the negative terminals 11 to come in contact with the negative terminal 12. To stop the motor 4, electrical connection between the battery 2 and the motor 4 can be disconnected by rotating the battery case 1 more than a predetermined angle to separate the negative terminals 11 and 12.

FIG. 2 is an enlarged end view of the motor case 3 shown in FIG. 1 to illustrate the state where the negative terminals 11 and 12 are brought into contact or separated. That is, when the negative terminals 11 and 12 are brought into contact with each other, the motor 4 is turned on, and when the negative terminal 12 is located at 12a and 12b as a result of the rotation of the battery case 1 (not shown. See FIG. 1.), the motor 4 is turned off. To clearly indicate the state where the negative terminals 11 and 12 are separated and brought into contact, mating marks (not shown) are provided on the outer circumferential surface at the joint parts of the battery case 1 and the motor case 3 shown in FIG. 1.

In a contact structure having the aforementioned construction, since the negative terminal 12 provided on the battery case 1 is located near the axial line side than the negative terminal 11 provided on the motor case 3, unexpected and unwanted troubles may occur when joining the battery case 1 with the motor case 3.

FIG. 3 is an enlarged longitudinal sectional view illustrating the state where the battery case 1 and the motor case 3 shown in FIG. 1 are joined together. Like parts are indicated by like numerals used in FIGS. 1 and 2. The battery to be housed in the battery case 1 is not shown in the figure. As shown in FIG. 3, a gap 1b into which the negative terminal 11 provided on the motor case 3 is too small because the negative terminal 12 provided on the battery case 1 is located in the vicinity of the inner circumferential surface 1a of the battery case 1. This poses the difficulty in joining the battery case 1 and the motor case 3.

In addition, if the battery case 1 is advanced by mistake in the joining direction in a state where the end of the battery case 1 exists on the side of the axial line of the negative terminal 11 provided on the motor case 1, as shown in FIG. 3, the negative terminal 11 may be sandwiched between the outer circumferential surface of the battery case 1 and the inner circumferential surface of the motor case 3, making it impossible to electrically connect the negative terminals 11 and 12.

Furthermore, if the battery case 1 and the motor case 3 are caused to rotate relatively in a state where the negative terminal 11 is sandwiched as described above, the outer circumferential surface, that is, the mating surface of the end of the battery case 1 is scraped by the negative terminal 11, resulting not only in insufficient mating with the motor case 3, but also in poor electrical connection.

SUMMARY OF THE INVENTION

This invention is intended to solve these problems inherent in the prior art. It is an object of this invention to provide a contact structure for toy motors which makes it extremely easy to join the battery case and the motor case and offers positive switching action between the terminals.

DETAILED DESCRIPTION OF THE EMBODIMENTS

Figure 1:
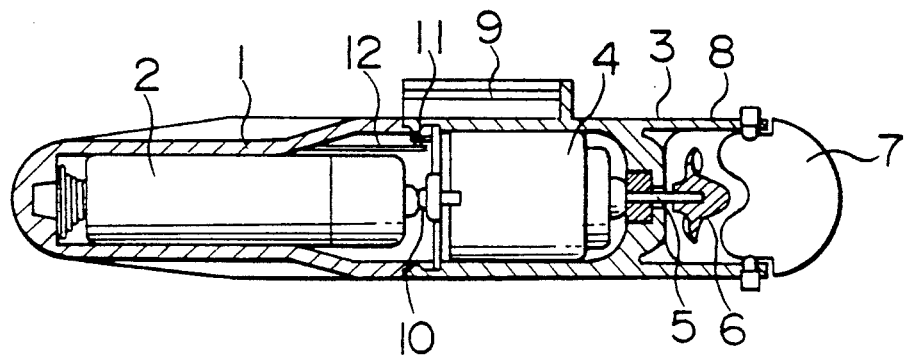
FIG. 1 is a longitudinal sectional view illustrating an example of a conventional type of submersible motor for toys.
Figure 2:
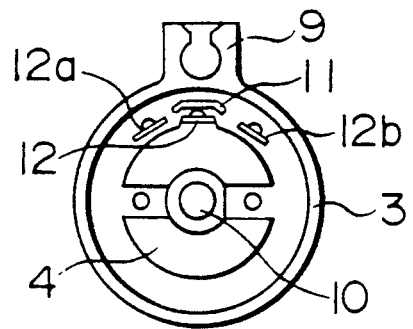
FIG. 2 is an enlarged end view of the motor case shown in FIG. 1.
Figure 3:
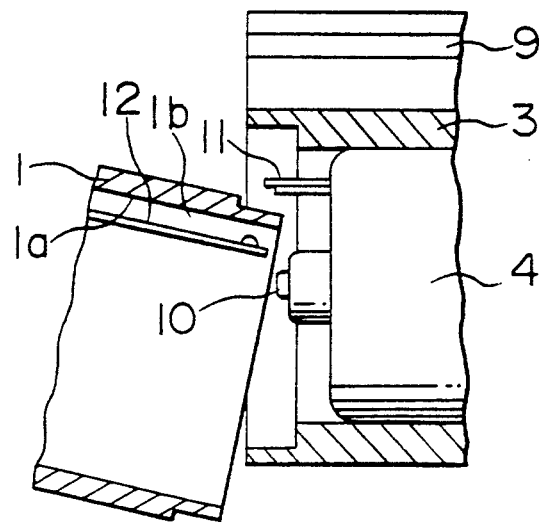
FIG. 3 is an enlarged longitudinal sectional view illustrating the state where the battery case and the motor case shown in FIG. 1 are joined together.
Figure 4:
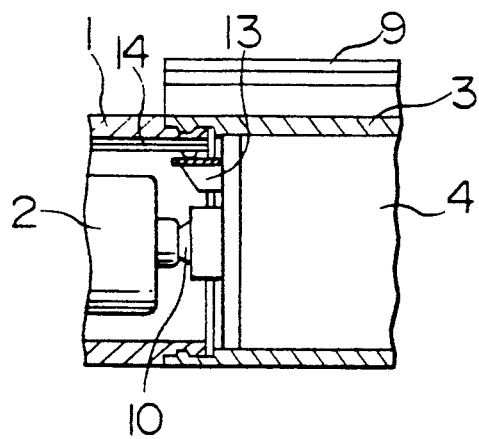
FIG. 4 is a longitudinal sectional view illustrating an embodiment of this invention.
Figure 5:
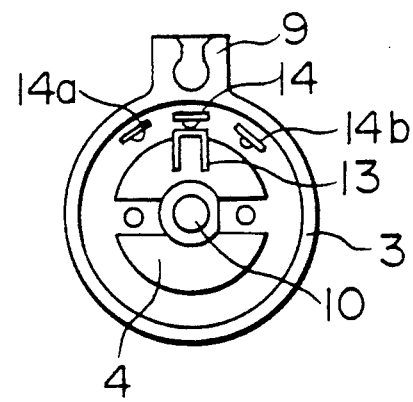
FIG. 5 is an end view illustrating the motor case shown in FIG. 4.
Figure 6A:
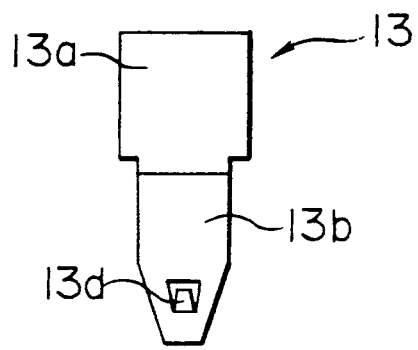
FIGS. 6A through 6C are an enlarged plan view, enlarged longitudinal sectional view and enlarged front view illustrating the motor terminals shown in FIG. 4.
Figure 6B:
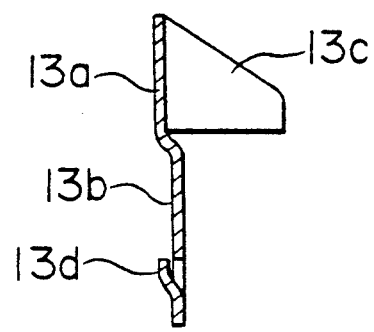
Figure 6C:
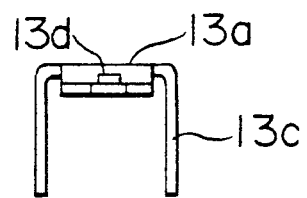

FIG. 4 is a longitudinal sectional view illustrating an embodiment of this invention. FIG. 5 is an end view illustrating the motor case 3 shown in FIG. 4. FIGS. 6A through 6C are an enlarged plan view, enlarged longitudinal sectional view and enlarged front view showing the motor terminal 13 shown in FIG. 4. Like parts are indicated by like numerals used in FIGS. 1 through 3. In FIGS. 4 through 6C, numerals 13 and 14 refer to a motor terminal and a battery terminal provided on the motor case 3 and the battery case 1, respectively, and formed in such a manner that the outer circumferential surface of the motor terminal 13 can be brought into contact with, and separated from the inner circumferential surface of the battery terminal 14. Consequently, when the motor terminal 13 is brought into contact with the battery terminal 14 in FIG. 5, the motor 4 is turned on; and when the battery terminal 14 is located at 14a and 14b, the motor 4 is turned off.

Next, the construction of the motor terminal 13 will be described. As shown in FIG 6C, the cross-sectional shape of the end of the motor terminal 13 is formed into a U shape having a closed end 13a on the side of the outer circumferential surface thereof, with the side of the axial line of the motor 4 being opened. That is, virtually triangular wings 13C are integrally formed on the side edges of the end of the strip-shaped base 13b. Numeral 13d indicates a projection for holding a brush arm.

With the aforementioned construction, when the battery case 1 and the motor case 3 are joined together, the inner circumferential surface of the battery terminal 14 is engaged with the outer circumferential surface of the motor terminal 13 in such a manner as to be brought into contact with, and separated from each other. Switching is therefore effected by rotating the battery case (not shown) to bring the battery terminal 14 and the motor terminal 13 into contact with each other and separate both from each other.

Figure 7:
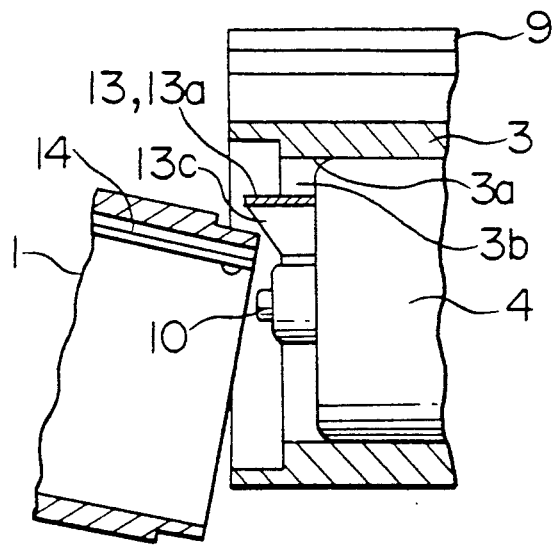
FIG. 7 is an enlarged longitudinal sectional view illustrating the state where the battery case and the motor case shown in FIG. 4 are joined together.

FIG. 7 is an enlarged longitudinal sectional view illustrating the state where the battery case 1 and the motor case 3 shown in FIG. 4 are joined together. Like parts are indicated by like numerals used in FIGS. 4 and 5. The battery to be housed in the battery case 1 is not shown in the figure. As shown in FIG. 7, if the battery case 1 is advanced in the joining direction in a state where the axial line of the battery case 1 is inclined, that is, where the end of the battery case 1 is located closer to the side of the axial line of the motor case 3 than the predetermined location thereof, as shown in FIG. 7, the end of the battery case 1 comes in contact with the end edges of the wings 13c of the motor terminals 13, the battery case 1 only pushes up the motor terminal 13, thus the further advancement of the battery case 1 in the joining direction can be prevented.

As a result, even if an attempt is made by mistake to join the battery case 1 and the motor case 3 in a misaligned state, they cannot be joined together. Thus, a fail-safe function is accomplished. The gap 3b between the motor terminal 13 and the inner circumferential surface 3a of the motor case 3 can be formed larger than in the case of the battery terminal 14, the battery terminal 14 can be advanced easily into the aforementioned gap.

In this embodiment, description has been made about an example where the end edges of the wings 13c of the motor terminal 13 are formed in an inclined state with respect to the axial line of the motor case 3, but the same operation can be expected if the aforementioned end edges are formed so as to intersect orthogonally with the axial line. The closed end 13a of the motor terminal may be formed not only into a flat surface but also into a cylindrical or spherical surface concentric with the axial line of the motor case 3, for example, or other appropriate surfaces so long as switching action is ensured by causing the motor terminal 13 to come in contact with, or separate from the battery terminal 14.

In the aforementioned embodiment, although description has been made about a submersible motor for toys, this invention is not limited to it, but this invention may of course be applied to a wide variety of motors of a construction having a switching function between the battery case housing a battery and the motor case housing a motor.

This invention having the aforementioned construction and operation can accomplish the following effects.

(1) Since the gap between the motor terminal and the inner circumferential surface of the motor case can be formed larger than in the prior art, the battery terminal can be easily and smoothly inserted into the gap, making the joining of the battery case and the motor case extremely easy.

(2) The battery case and the motor case can be prevented from being joined together in a misaligned state by mistake or for other reasons. Switching errors due to the unwanted nipping of the motor terminal, or the improper joining of the cases due to the chipping of the case mating surfaces that had been often experienced in the past can be prevented. All this ensures positive switching between terminals.

What is claimed is:

1. A contact structure for toy motors in which a battery case housing a battery and a motor case housing a motor are detachably and relatively rotatably joined by means of the outer circumferential surface of the end of said battery case and the inner circumferential surface of the end of said motor case, and terminals are provided in the vicinity of the ends of both cases in such a manner that said terminals can be brought into contact with, or separated from each other, characterized in that the cross-sectional shape of the ends of motor terminals provided on said motor case are each formed into a U shape having a closed end on the side of the outer circumferential surface thereof, with the end thereof on the side of the axial line of said motor being opened, and the inside surfaces of said battery terminals are brought into contact with the outer circumferential surfaces of the closed ends of said motor terminals.

2. A contact structure for toy motors as set forth in claim 1 wherein the outer surface of the closed ends of said motor terminals is formed into a substantially flat surface.

3. A contact structure for toy motors as set forth in claim 1 wherein the outer surface of the closed ends of said motor terminals is formed into a curved surface.

4. A contact structure for toy motors as set forth in claim 1 wherein the end edges of said motor terminals are formed in an inclined state with respect to the axial line of said motor case.

* * * * *